United States Patent [19]
Wiegand et al.

[11] Patent Number: 4,957,720
[45] Date of Patent: Sep. 18, 1990

[54] PROCESS FOR THE GENERATION OF MECHANICAL ENERGY IN THE AMMONIA OXIDATION STEP OF A NITRIC ACID PRODUCTION PROCESS

[75] Inventors: Karl W. Wiegand; Michael Thiemann; Erich Scheibler, all of Dortmund, Fed. Rep. of Germany

[73] Assignee: UHDE GmbH, Dortmund, Fed. Rep. of Germany

[21] Appl. No.: 472,754

[22] Filed: Jan. 31, 1990

[30] Foreign Application Priority Data

Feb. 7, 1989 [DE] Fed. Rep. of Germany ....... 3903570

[51] Int. Cl.$^5$ .................. C01B 21/26; C01B 21/40
[52] U.S. Cl. .................................... 423/392; 423/393; 423/403
[58] Field of Search .............. 423/392, 393, 403

[56] References Cited

U.S. PATENT DOCUMENTS

| | | | |
|---|---|---|---|
| 1,954,317 | 4/1934 | Hobler | 423/392 |
| 2,031,215 | 2/1936 | Hobler | 423/392 |
| 3,441,380 | 4/1969 | Morrow | 423/392 |
| 3,450,498 | 6/1969 | Sales | 423/392 |

FOREIGN PATENT DOCUMENTS

| | | | |
|---|---|---|---|
| 509297 | 1/1955 | Canada | 423/392 |
| 605464 | 9/1960 | Canada | 423/392 |
| 1298970 | 7/1969 | Fed. Rep. of Germany | 423/392 |
| 1481383 | 5/1966 | France | 423/392 |
| 649650 | 2/1979 | U.S.S.R. | 423/392 |
| 1278828 | 6/1972 | United Kingdom | 423/392 |

Primary Examiner—Richard L. Stoll
Assistant Examiner—Wayne A. Langel
Attorney, Agent, or Firm—Toren, McGeady & Associates

[57] ABSTRACT

A process for the generation of mechanical energy in the ammonia oxidation step of process for the production of nitric acid is disclosed, whereby the utilization of process heat is improved, particularly the exploitation of heat contained in $NO_x$ gases and including process heat recovered at low temperature. The process involves evaporating and superheating liquid ammonia upstream of the oxidation step, at a pressure which is a multiple of the pressure required for the combustion, using the process heat of the $NO_x$ gases formed during the the combustion and then expanding the superheated ammonia in a turbine, thus generating mechanical energy.

14 Claims, 3 Drawing Sheets

PROCESS FOR THE GENERATION OF MECHANICAL ENERGY IN THE AMMONIA OXIDATION STEP OF A NITRIC ACID PRODUCTION PROCESS

BACKGROUND OF THE INVENTION

This invention relates to a process for the generation of mechanical energy in the ammonia oxidation step of a process for the production of nitric acid, i.e. the step wherein ammonia is burned to form $NO_x$.

When oxidizing ammonia to form $NO_x$ gases required for nitric acid production, the oxidation normally takes place at a temperature of 800° to 970° C. However, low temperatures are preferred for the absorption of $NO_x$ gases in water to form $HNO_3$ in order to meet the reaction requirements. Therefore, the $NO_x$ gas stream must be cooled prior to entering the absorption unit.

As a rule, this cooling process takes place at a high temperature, using the proces heat to generate steam and/or to heat the tail gas from the absorption step and the resultant gas is subsequently expanded, for instance, in a turbine. In this case, the $NO_x$ gases at about <200° C. are cooled without exploiting the process heat; the heat transferred is dissipated via a cooling system. Consequently, the heat still contained in the $NO_x$ gases is not converted to energy and, depending on the process involved, larger quantities of cooling water are required causing higher operating costs, or larger heat exchangers must be installed which results in higher investment costs.

SUMMARY OF THE INVENTION

The object of the invention is the provision of a process for the production of nitric acid wherein the process heat is better utilized.

A particular object of the invention is the recovery, at relatively low temperature, of process heat in $NO_x$ gases produced during the ammonia oxidation in the production of nitric acid.

These and other objects are obtained by the invention, which involves a process as described above, wherein, prior to being oxidized, liquid ammonia is evaporated and superheated with the aid of the process heat in the $NO_x$ gases, at a pressure which is a multiple of the combustion pressure and the superheated ammonia is then expanded in a turbine and thus converted to mechanical energy.

Thus, according to the invention, mechanical energy is generated in the ammonia oxidation step of a nitric acid producing process, wherein ammonia is burned to form $NO_x$, by evaporating and superheating ammonia upstream of the oxidation step, at a pressure which is a multiple of the combustion pressure, using the process heat of the $NO_x$ gases formed during the combustion and then expanding the superheated ammonia in a turbine to generate mechanical energy.

DESCRIPTION OF THE INVENTION

By means of the process of the invention, the recovery of process heat available during nitric acid production is substantially improved because the process heat of the $NO_x$ gases can be utilized at a lower temperature range. This technology is implemented with the aid of ammonia, which is used as the heat transfer fluid since it can be evaporated and superheated at a relatively low temperature at a given pressure. If water were used, as in the case of thermal engines, higher temperatures would be required. Further, in the method of the invention the energy is directly available for the process.

In a particularly preferred embodiment of the invention, the evaporation and superheating of liquid ammonia is carried out at a pressure of 10 to 60 bars, even more preferably at about 25 bars, which considerably improves the energy balance of the process.

Depending on the pressure selected, the ammonia is superheated to a temperature of 130° to 250° C., preferably to 140° to 180° C. Superheating can be carried out with the aid of the $NO_x$ process gas even at a relatively low temperature, so that the process heat of this gas can be fully utilized.

It is also preferred that the superheated ammonia be expanded in a back-pressure turbine to the pressure used for combustion. Of course, the pressure will be reduced only to the extent which allows pressure drops between the turbine and the burner to be compensated.

Figure 1:
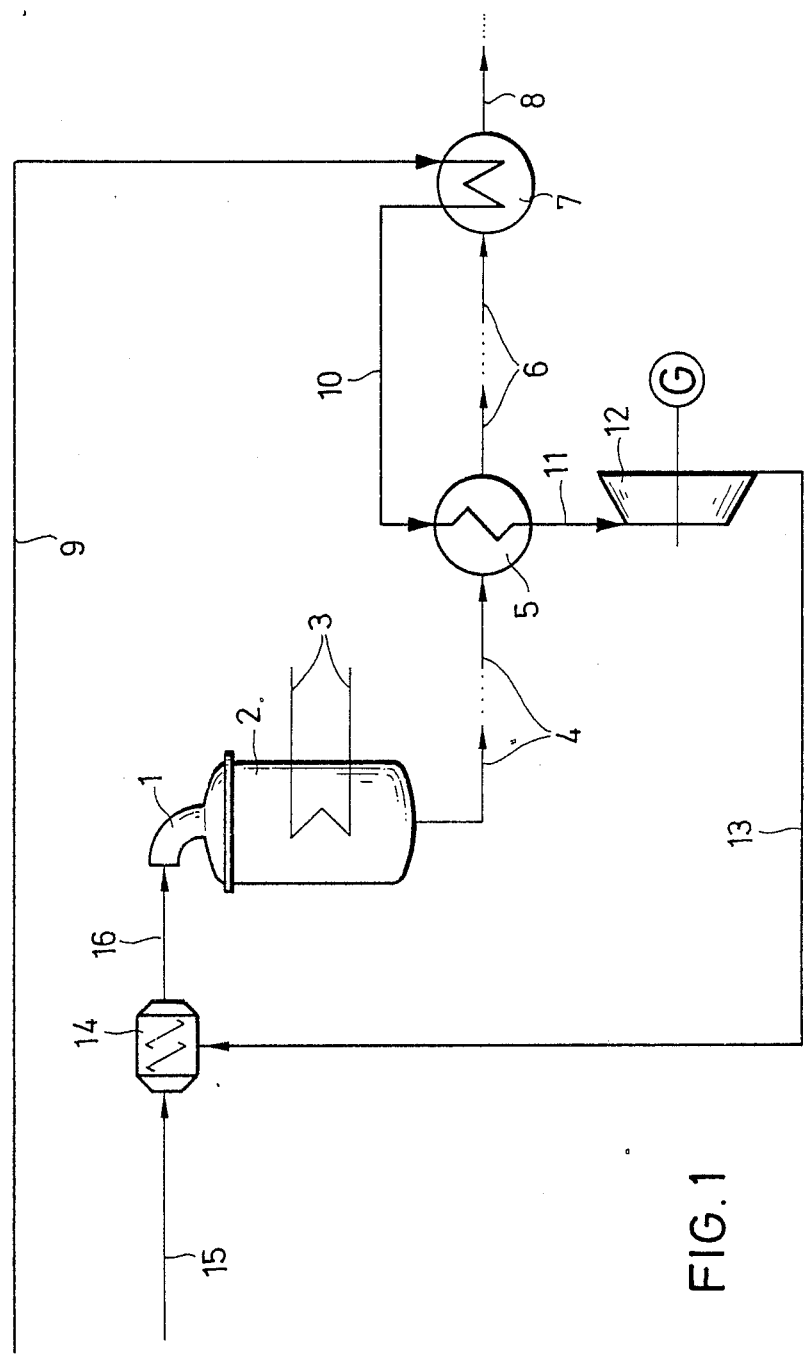
FIG. 1 illustrates a simplified configuration of the oxidation unit of a nitric acid production plant according to a first embodiment of the invention.

With reference to FIG. 1, which shows a simplified configuration of the oxidation unit of a nitric acid plant, the burner 1, in which a mixture of ammonia and air is burned to form $NO_x$ gases, is connected to heat exchanger 2. The heat exchanger 2 may be, for example, a steam generator fed with water via line 3, the water being evaporated in the steam generator with the aid of the process heat of the $NO_x$ gases resulting from the combustion in the burner. The $NO_x$ gases leave the evaporator (heat exchanger 2) via line 4, which is connected to the outlet of the heat exchanger 2 and if required, can be fed to further heat exchangers not shown in the drawing.

Line 4 communicates with superheater 5, in which the heat of the $NO_x$ gases is used for superheating the ammonia. The $NO_x$ gases which leave superheater 5 are piped to ammonia evaporator 7 via line 6 and, if required, via additional heat exchangers tied in, but not shown in the drawing. Line 8, which is also connected to the outlet of evaporator 7, is required in order to pipe the cooled $NO_x$ gases to further downstream equipment, if any, and finally to the absorption unit which has not been described herein.

Liquid ammonia is piped at high pressure from a tank (not shown) to evaporator 7 via feed line 9. A pump may be inserted in line 9 to increase the liquid ammonia pressure to the required value. Evaporator 7 is connected to superheater 5 via line 10.

From superheater 5, in which the liquid ammonia is superheated by means of the heat of the $NO_x$ gas, the ammonia is transferred via line 11 to back-pressure turbine 12, in which the superheated ammonia is expanded. A further ammonia line 13 is installed between the outlet of turbine 12 and the inlet of mixer 14, in which the expanded, but not completely superheated ammonia is mixed with make-up air fed to the mixer via line 15. Mixer 14 is connected to burner 1 via line 16.

Liquid ammonia is piped through line 9 at a pressure of 10 to 60 bars and enters evaporator 7 in which complete evaporation takes place. The evaporated ammonia flows through line 10 and enters superheater 5, in which it is superheated to a temperature of 130° to 250° C. In this state, the ammonia is fed to and expanded in back-pressure turbine 12 without being completely desuperheated and the pressure is reduced, preferably to the value applied in the burner.

The expanded ammonia is fed to mixer 14 via line 13 and mixed with make-up air. The mixture of ammonia and air enters burner 1 wherein normal combustion takes place at approximately 900° C. to form $NO_x$ gases.

The $NO_x$ gases from the burner are cooled in heat exchanger 2 to approximately 450° C. whereby the cooling agent, perferably water, is heated or evaporated. The cooled $NO_x$ gases are withdrawn via line 4 and fed to additional heat exchangers, if required. In downstream superheater 5, the $NO_x$ gases are used to superheat the evaporated ammonia, then piped through line 6 and fed to evaporator 7, in which the $NO_x$ gases are further cooled, whereby their process heat is exploited for the evaporation of liquid ammonia. The $NO_x$ gases are subsequently piped through line 8 to the downstream absorption unit; additional devices may be included in this line, if desired.

Figure 2:
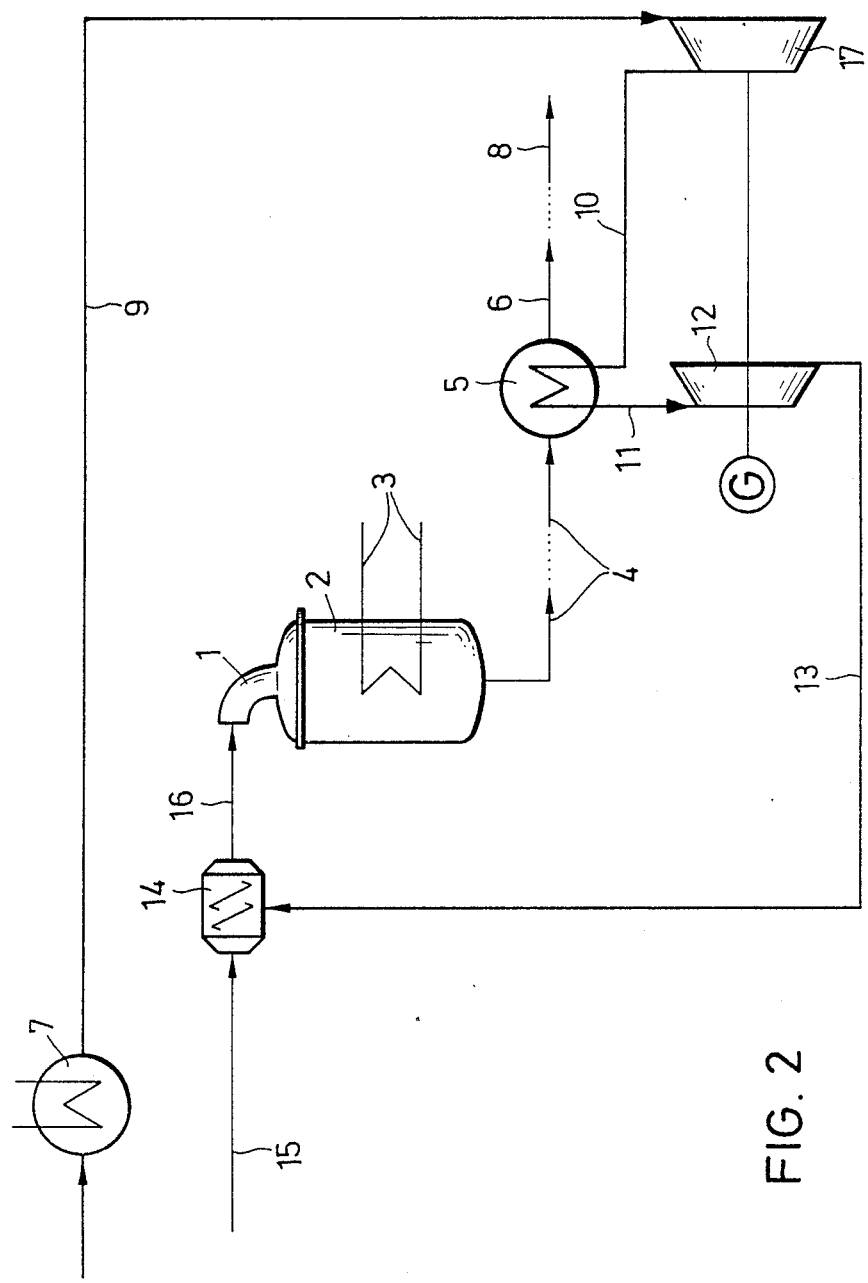
FIG. 2 illustrates a simplified configuration of the oxidation unit of a nitric acid production plant according to a second embodiment of the invention.

With reference to FIG. 2, which illustrates another embodiment of the invention, the equipment and the numbering are the same as in FIG. 1, except that an ammonia compressor 17 has been added which is directly coupled with back-pressure turbine 12. According to this embodiment of the process of the invention, liquid ammonia is first evaporated in evaporator 7, which permits utilization of the cooling potential, and subsequently, the ammonia is compressed in ammonia compressor 17 prior to being superheated in superheater 5 and expanded in the downstream back-pressure turbine 12. Turbine 12 drives compressor 17, the power required for compressor 12 being lower than the output of turbine 12.

The expanded but not completely desuperheated ammonia is piped via line 13 to mixer 14 and mixed with air. The ammonia/air mixture is burned in burner 1, whereby $NO_x$ gases form which are piped to superheater 5. According to the illustration of this embodiment of the invention, the $NO_x$ gases are shown as being used only in superheater 5 to superheat the ammonia, but they may also pass through evaporator 7.

The following example further illustrates the best mode currently contemplated for carrying out the invention, but must not be construed as limiting the invention in any manner.

EXAMPLE

Figure 3:
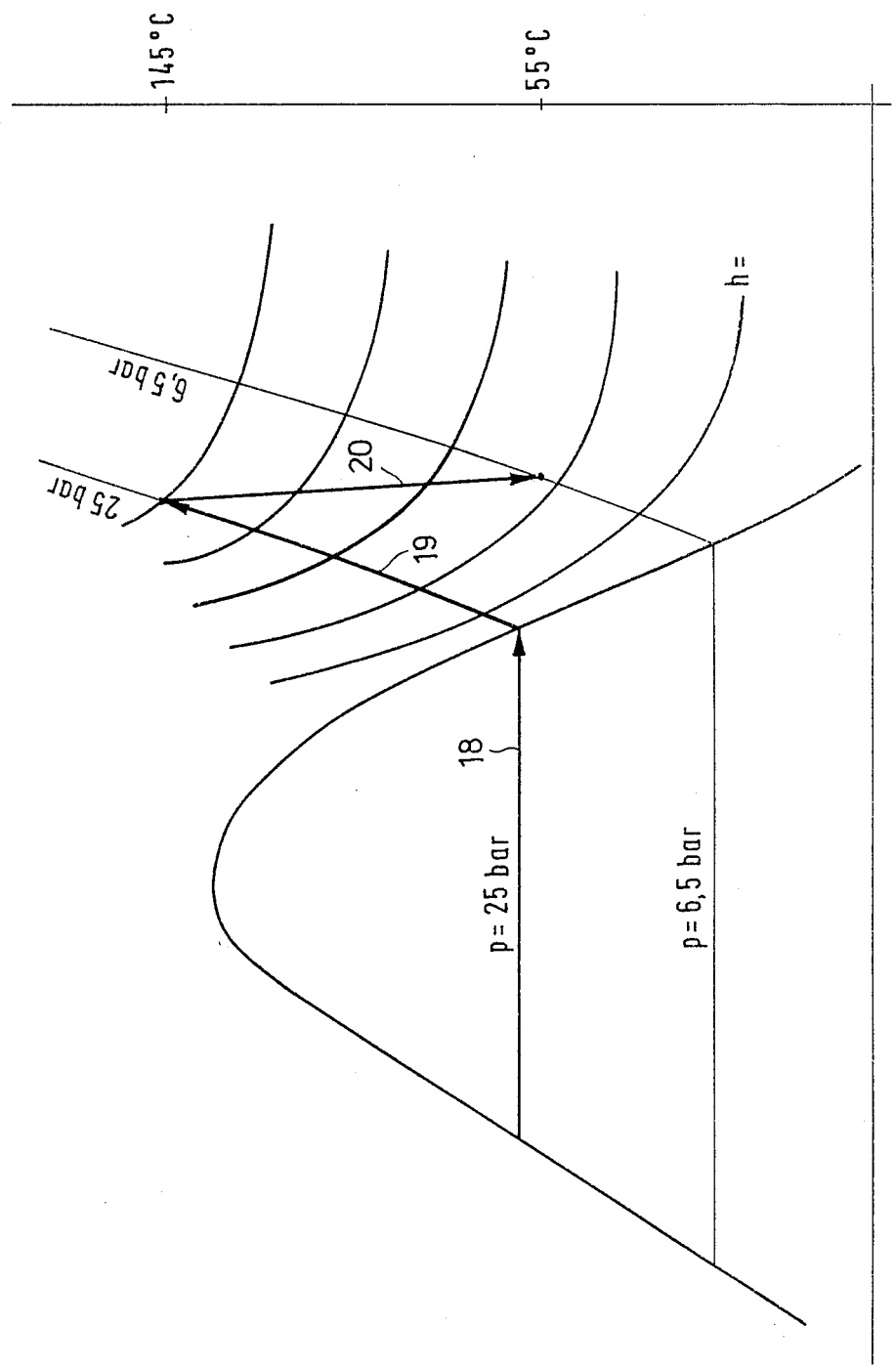
FIG. 3 is a simplified representation of the temperature/enthropy diagram for ammonia.

With reference to FIG. 1, liquid ammonia at 25° C. and 25 bars is fed to evaporator 7 in which isobaric evaporation takes place at 58° C. The temperature/enthropy diagram in FIG. 3 shows the isobar marked 18 located in the two-phase range of the evaporation. Superheating also takes place under isobaric conditions, the ammonia being heated to 145° C. This change in state is marked 19 in FIG. 3.

The superheated ammonia is expanded to 6.5 bars in back-pressure turbine 12; this change in state is marked 20 in FIG. 3. At a turbine efficiency of 75%, the enthalpy difference amounts to approximately 3000 kJ/kmol.

Assuming that the flow rate for an ammonia plant of 1800 tpd is approximately 1280 kmol/h., this embodiment of the invention permits a turbine output of about 1.04 MW.

It is of course possible to modify the embodiments of the invention illustrated in the drawings, while maintaining the principles of the invention. Hence, the invention is not limited to the particular embodiments which have been illustrated. For example, the ammonia may be heated with other transfer fluids, such as hot tail gas, etc.

We claim:

1. A process for gernerating mechanical energy in the ammonia oxidation step of a nitric acid production process, wherein the combustion of ammonia is carried out to form $NO_x$, comprising evaporating and superheating liquid ammonia upstream of the oxidation step at a pressure which is a multiple of the combustion pressure by means of process heat of the $NO_x$ gases formed during the combustion of ammonia and then expanding the superheated ammonia in a turbine to generate mechanical energy.

2. The process according to claim 1, in which the liquid ammonia is evaporated and superheated at a pressure of 10 to 60 bars.

3. The process according to claim 1, in which the liquid ammonia is evaporated and superheated at a pressure of about 25 bars.

4. The process according to claim 1, in which the ammonia is superheated to 130° to 250° C.

5. The process according to claim 1, in which the ammonia is superheated to 140° to 180° C.

6. The process according to claim 1, in which the superheated ammonia is expanded in a back-pressure turbine to the pressure required for the combustion.

7. The process according to claim 1, in which the liquid ammonia is evaporated and superheated to about 130° to 250° C. at a pressure of about 10 to 60 bars and the superheated ammonia is expanded in a back-pressure turbine to the pressure required for the combustion.

8. In a process for the manufacture of nitric acid, which includes the step of oxidizing ammonia by combustion to produce $NO_x$ gases, the generation of mechanical energy by steps which comprise using the process heat of the $NO_x$ gases formed during the combustion to evaporated and superheat liquid ammonia upstream of the oxidation step at a pressure which is a multiple of the combustion pressure and then expanding the superheated ammonia in a turbine to generated mechanical energy.

9. The process according to claim 8, in which the liquid ammonia is evaporated and superheated at a pressure of 10 to 60 bars.

10. The process according to claim 8, in which the liquid ammonia is evaporated and superheated at a pressure of about 25 bars.

11. The process according to claim 8, in which the ammonia is superheated to 130° to 250° C.

12. The process according to claim 8, in which the ammonia is superheated to 140° to 180° C.

13. The process according to claim 8, in which the superheated ammonia is expanded in a back-pressure turbine to the pressure required for the combustion.

14. The process according to claim 8, in which the liquid ammonia is evaporated and superheated to about 130° to 250° C. at a pressure of about 10 to 60 bars and the superheated ammonia is expanded in a back-pressure turbine to the pressure required for the combustion.

* * * * *